United States Patent
Salamon et al.

(10) Patent No.: US 10,860,733 B1
(45) Date of Patent: Dec. 8, 2020

(54) SHREDDING SYSTEM AND METHOD

(71) Applicant: EMC IP Holding Company, LLC, Hopkinton, MA (US)

(72) Inventors: Victor Salamon, Edmonton (CA); Ying Xie, Edmonton (CA)

(73) Assignee: EMC IP Holding Company, LLC, Hopkinton, MA (US)

( * ) Notice: Subject to any disclaimer, the term of this patent is extended or adjusted under 35 U.S.C. 154(b) by 149 days.

(21) Appl. No.: 15/492,497

(22) Filed: Apr. 20, 2017

(51) Int. Cl.
*G06F 21/62* (2013.01)
*G06F 3/06* (2006.01)

(52) U.S. Cl.
CPC .......... *G06F 21/6218* (2013.01); *G06F 3/067* (2013.01); *G06F 3/0623* (2013.01); *G06F 3/0652* (2013.01); *G06F 2221/2143* (2013.01)

(58) Field of Classification Search
CPC .. G06F 21/6218; G06F 3/0623; G06F 3/0652; G06F 3/067
See application file for complete search history.

(56) References Cited

U.S. PATENT DOCUMENTS

| | | | | |
|---|---|---|---|---|
| 8,090,899 B1* | 1/2012 | Syu | ...................... | G06F 12/0246 711/103 |
| 9,250,687 B1* | 2/2016 | Aswadhati | ............ | G06F 1/3225 |
| 2006/0015945 A1* | 1/2006 | Fields | .................... | G06F 21/606 726/27 |
| 2006/0200357 A1* | 9/2006 | Dewey | .................. | G06F 3/0623 711/159 |
| 2006/0282629 A1* | 12/2006 | Stuart | ............... | G06F 17/30082 711/159 |
| 2007/0233931 A1* | 10/2007 | Tanaka | ................. | G06F 12/0246 711/5 |
| 2009/0327602 A1* | 12/2009 | Moore | .................. | G06F 3/0616 711/114 |
| 2010/0191897 A1* | 7/2010 | Zhang | .................. | G06F 12/0246 711/103 |
| 2013/0036256 A1* | 2/2013 | Kawamura | ........... | G06F 3/0623 711/103 |

FOREIGN PATENT DOCUMENTS

RU    2016111880    * 3/2016

\* cited by examiner

*Primary Examiner* — Harunur Rashid
(74) *Attorney, Agent, or Firm* — Brian J. Colandreo; Mark H. Whittenberger; Holland & Knight LLP (57) ABSTRACT

A method, computer program product, and computing system for receiving a shred command from a host on a storage device associated with a main storage copy within a redundant storage system. The shred command with respect to the main storage copy is processed on the storage device associated with the main storage copy.

9 Claims, 4 Drawing Sheets

SHREDDING SYSTEM AND METHOD

TECHNICAL FIELD

This disclosure relates to shredding systems and methods and, more particularly, to shredding systems and methods for use within a virtualized environment.

BACKGROUND

Storing and safeguarding electronic content is of paramount importance in modern business. Accordingly, various methodologies may be employed to protect and distribute such electronic content. For example, high-availability, virtualized storage systems may be utilized to provide users with access to virtual machines (and associated virtualized storage) that may be custom tailored to the needs and desires of the user. Unfortunately and when utilizing such virtualized systems, safeguards should be employed to prevent unauthorized access to the same.

SUMMARY OF DISCLOSURE

In one implementation, a computer-implemented method is executed on a computing system and includes receiving a shred command from a host on a storage device associated with a main storage copy within a redundant storage system. The shred command with respect to the main storage copy is processed on the storage device associated with the main storage copy.

One or more of the following features may be included. A media type may be determined for the main storage copy. Processing the shred command with respect to the main storage copy may include processing the shred command with respect to the main storage copy on the storage device associated with the main storage copy based, a least in part, upon the media type. The shred command may be forwarded to a storage device associated with at least one protection copy within the redundant storage system. The shred command with respect to the at least one protection copy may be processed on the storage device associated with the at least one protection copy. A media type may be determined for the at least one protection copy. Processing the shred command with respect to the at least one protection copy may include processing the shred command with respect to the at least one protection copy on the storage device associated with the at least one protection copy based, a least in part, upon the media type.

In another implementation, a computer program product resides on a computer readable medium and has a plurality of instructions stored on it. When executed by a processor, the instructions cause the processor to perform operations including receiving a shred command from a host on a storage device associated with a main storage copy within a redundant storage system. The shred command with respect to the main storage copy is processed on the storage device associated with the main storage copy.

One or more of the following features may be included. A media type may be determined for the main storage copy. Processing the shred command with respect to the main storage copy may include processing the shred command with respect to the main storage copy on the storage device associated with the main storage copy based, a least in part, upon the media type. The shred command may be forwarded to a storage device associated with at least one protection copy within the redundant storage system. The shred command with respect to the at least one protection copy may be processed on the storage device associated with the at least one protection copy. A media type may be determined for the at least one protection copy. Processing the shred command with respect to the at least one protection copy may include processing the shred command with respect to the at least one protection copy on the storage device associated with the at least one protection copy based, a least in part, upon the media type.

In another implementation, a computing system includes a processor and a memory system configured to perform operations including receiving a shred command from a host on a storage device associated with a main storage copy within a redundant storage system. The shred command with respect to the main storage copy is processed on the storage device associated with the main storage copy.

One or more of the following features may be included. A media type may be determined for the main storage copy. Processing the shred command with respect to the main storage copy may include processing the shred command with respect to the main storage copy on the storage device associated with the main storage copy based, a least in part, upon the media type. The shred command may be forwarded to a storage device associated with at least one protection copy within the redundant storage system. The shred command with respect to the at least one protection copy may be processed on the storage device associated with the at least one protection copy. A media type may be determined for the at least one protection copy. Processing the shred command with respect to the at least one protection copy may include processing the shred command with respect to the at least one protection copy on the storage device associated with the at least one protection copy based, a least in part, upon the media type.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
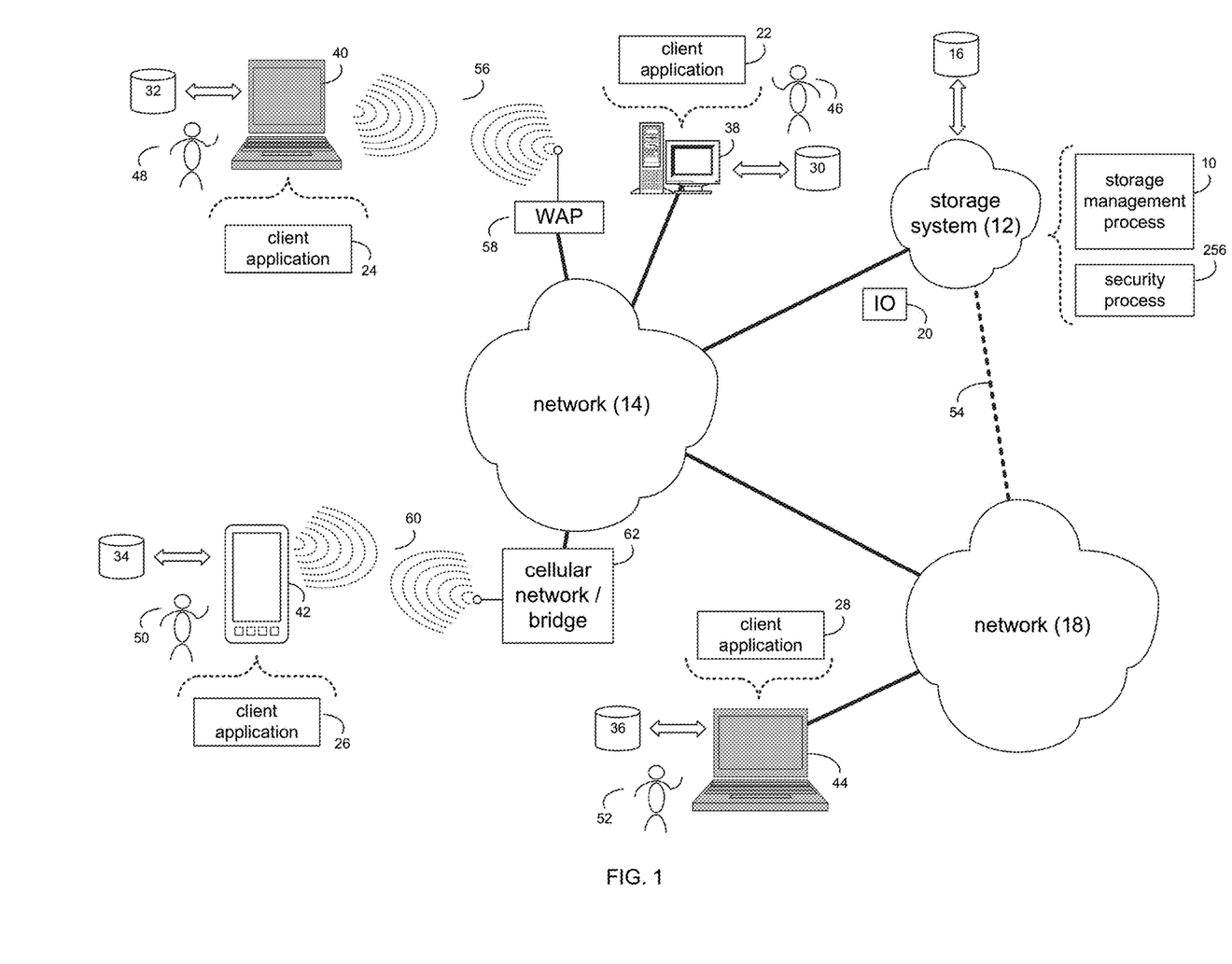
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
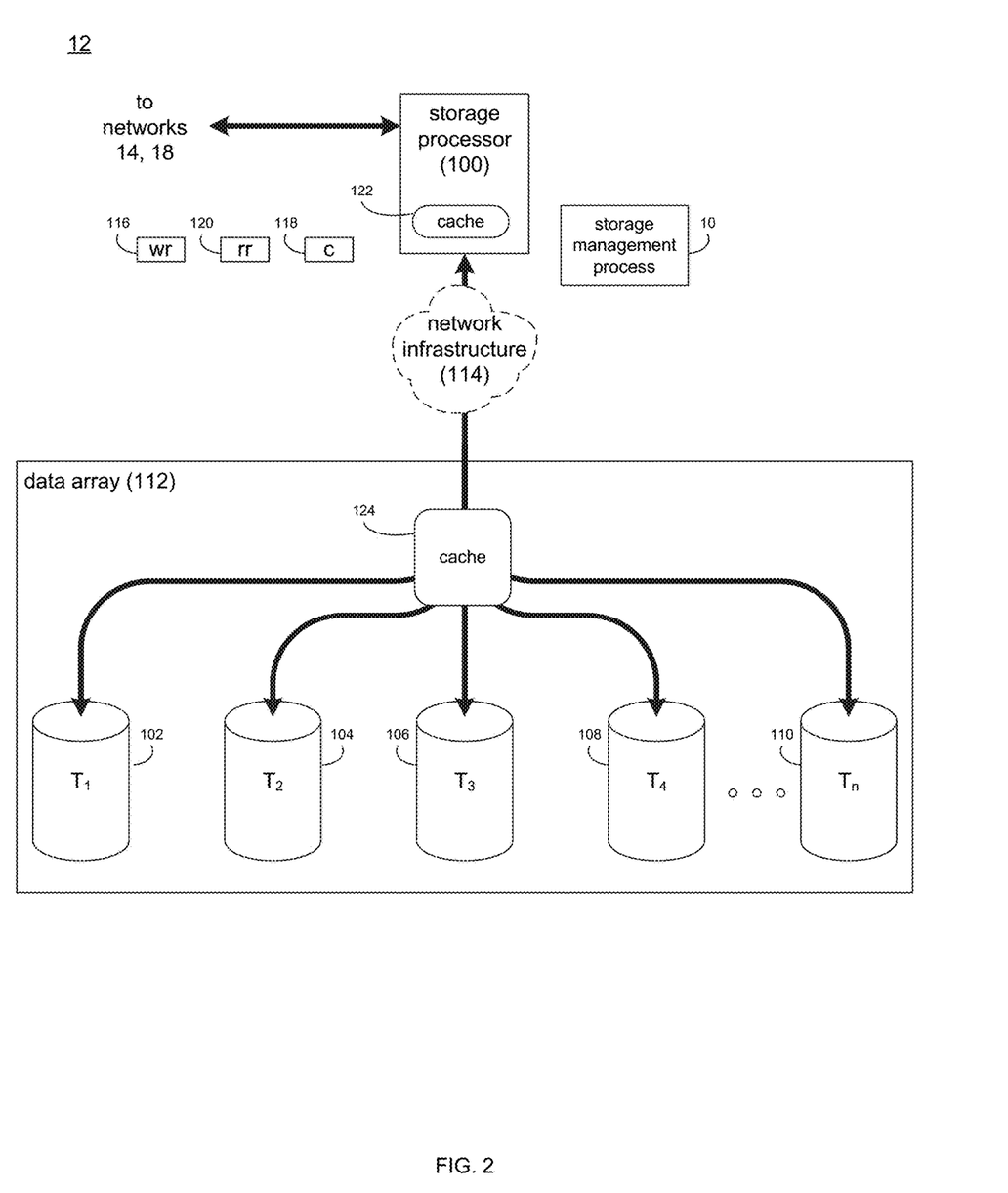
FIG. 2 is a diagrammatic view of an implementation of the storage system of FIG. 1.

Referring also to FIG. 2, there is shown one particular implementation of storage system 12. Storage system 12 may include storage processor 100 and a plurality of storage targets T 1-n (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g.

storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Figure 3:
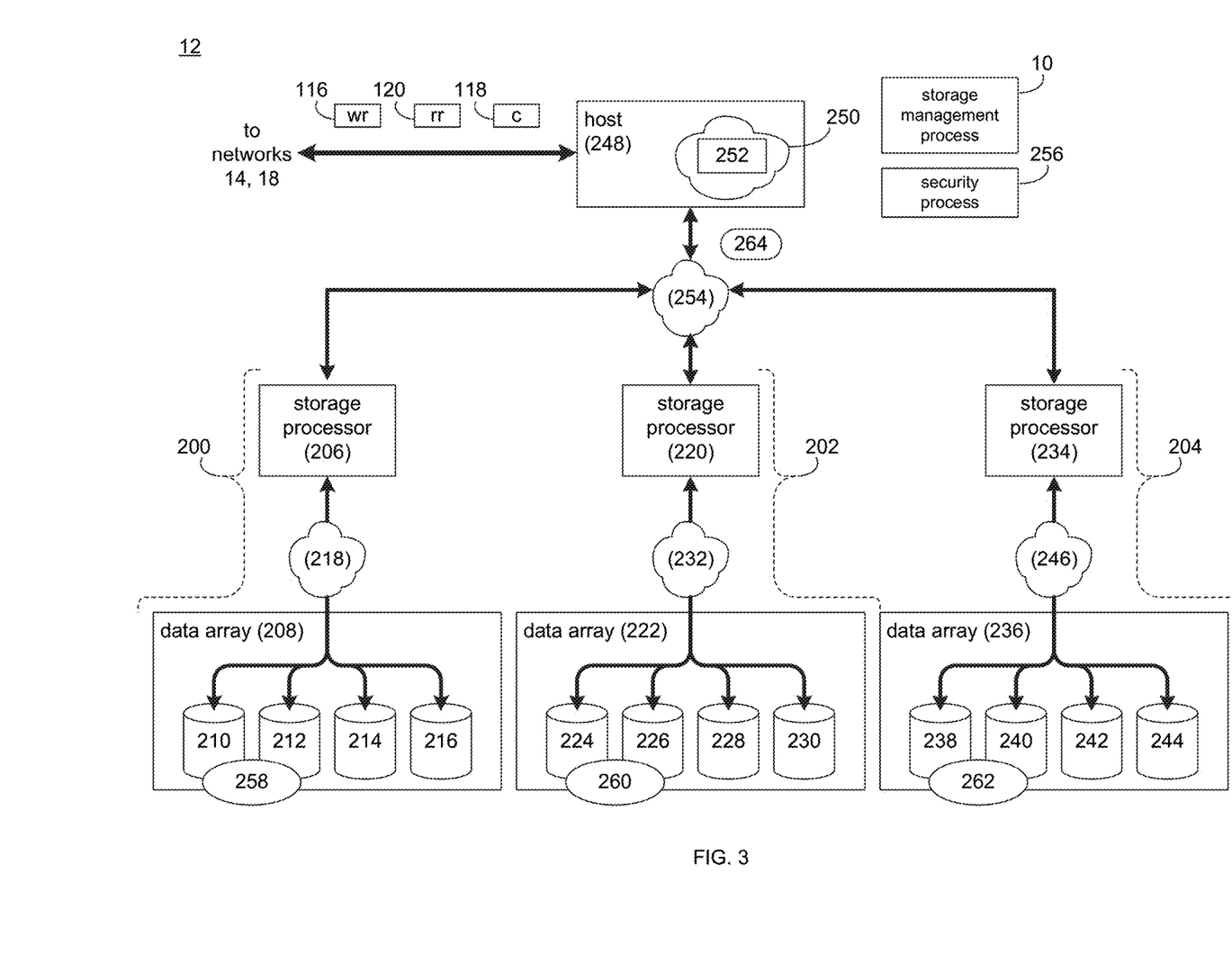
FIG. 3 is a diagrammatic view of another implementation of the storage system of FIG. 1 including a shredding process.

A Virtualized Environment:

Referring also to FIG. 3, there is shown another implementation of storage system 12 that may include multiple storage subsystems (e.g., subsystems 200, 202, 204).

For illustrative purposes only, the first subsystem (e.g., subsystem 200) is shown to include a first storage processor (e.g., storage processor 206) coupled to a first data array (e.g., data array 208) that includes storage targets 210, 212, 214, 216 which may be coupled using network infrastructure 218, examples of which may include but are not limited to an Ethernet (e.g., Layer 2 or Layer 3) network, a fiber channel network, an InfiniBand network, or any other circuit switched/packet switched network.

Further and for illustrative purposes only, the second subsystem (e.g., subsystem 202) is shown to include a second storage processor (e.g., storage processor 220) coupled to a second data array (e.g., data array 222) that includes storage targets 224, 226, 228, 230 which may be coupled using network infrastructure 232, examples of which may include but are not limited to an Ethernet (e.g., Layer 2 or Layer 3) network, a fiber channel network, an InfiniBand network, or any other circuit switched/packet switched network.

Additionally and for illustrative purposes only, the third subsystem (e.g., subsystem 204) is shown to include a third storage processor (e.g., storage processor 234) coupled to a third data array (e.g., data array 236) that includes storage targets 238, 240, 242, 244 which may be coupled using network infrastructure 246, examples of which may include but are not limited to an Ethernet (e.g., Layer 2 or Layer 3) network, a fiber channel network, an InfiniBand network, or any other circuit switched/packet switched network.

While this implementation of storage system 12 is shown to include three subsystems (e.g., subsystems 200, 202, 204), this is for illustrative purposes only and is not intended to be a limitation of this disclosure. For example, the number of subsystems may be increased or decreased depending upon the needs of the user and/or design criteria.

Further and while this implementation of storage system 12 is shown to include subsystems (e.g., subsystem 200, 202, 204) that each include four storage targets each (e.g., subsystem 200 having storage targets 210, 212, 214, 216; subsystem 202 having storage targets 224, 226, 228, 230; and subsystem 204 having storage targets 238, 240, 242, 244), this is for illustrative purposes only and is not intended to be a limitation of this disclosure. For example, the number of storage targets may be increased or decreased depending upon the needs of the user and/or design criteria.

Storage system 12 may further include host 248 (e.g., a virtualization system such as a virtualization appliance) that may allow for seamless access to one or more of subsystems 200, 202, 204. Specifically, host 248 may execute virtual machine operating environment 250. An example of virtual machine operating environment 250 may include but is not limited to a hypervisor, which is an instantiation of an operating system that may allow for one or more virtual machines (e.g., virtual machine 252) to operate within a single physical device. Accordingly, the combination of host 248, virtual machine operating environment 250, and virtual machine 252 may allow one or more users to access the resources of subsystems 200, 202, 204.

Host 248, subsystem 200, subsystem 202 and subsystem 204 may be coupled using network infrastructure 254, examples of which may include but are not limited to an Ethernet (e.g., Layer 2 or Layer 3) network, a fiber channel network, an InfiniBand network, or any other circuit switched/packet switched network.

The Security Process:

Storage system 12 may execute all or a portion of security process 256. The instruction sets and subroutines of security process 256, which may be stored on a storage device (e.g., storage device 16) coupled to storage system 12, may be executed by one or more processors (not shown) and one or more memory architectures (not shown) included within any portion, system and/or subsystem of storage system 12. Storage device 16 may include but is not limited to: a hard disk drive; a tape drive; an optical drive; a RAID device; a random access memory (RAM); a read-only memory (ROM); and all forms of flash memory storage devices.

Assume that for this particular example, storage system 12 is configured as a redundant storage system, wherein high availability may be provided by storing multiple data copies (or portions thereof) within storage system 12. For example, assume that user 46 is working on a project that requires a redundant storage space that includes main storage copy 258, first protection copy 260 and second protection copy 262.

For example, the redundant storage space utilized by user 46 may be configured as a mirrored storage space in which first protection copy 260 and second protection copy 262 are mirrored copies of main storage copy 258. Alternatively, the redundant storage space utilized by user 46 may be configured as a backed up storage space in which first protection copy 260 and second protection copy 262 are backup and/or snapshot copies of main storage copy 258. Further still, the redundant storage space utilized by user 46 may be configured as a replicated storage space in which first protection copy 260 and second protection copy 262 are replication copies of main storage copy 258.

Continuing with the above-stated example, assume that the project that user 46 has been working on has been completed and the above-described redundant storage space is no longer needed. Accordingly, user 46 (or a system administrator) may initiate a shredding process on the above-described redundant storage space. Therefore, main storage copy 258, first protection copy 260 and second protection copy 262 may all be shredded, including any and all data stored thereon.

As is known in the art, a shredding process is a data destruction method that is designed to securely erase data storage devices. Shredding processes may utilize an overwrite methodology to ensure complete destruction of the data. For example and as is known in the art, when data is deleted in a traditional fashion, the computing system does not actually delete the data and simply marks the data as no longer needed. Accordingly, the data is still on the storage device and the only thing that is deleted is the pointer within the operating system that locates the data. However, the data itself is still located on the storage device. Since the actual data is still resident on the storage device, it is typical possible to recover the data using one or more data recovery utilities (e.g., Recuva™ and Puran™). Unlike a traditional erase operation, a shredding process may overwrite the data that was deleted one or more times (typically 3-7 times), thus completely destroying the deleted data on the storage device and making it unrecoverable.

Accordingly and when initiating a shredding process on the above-described redundant storage space, shred command 264 may be generated. For example, shred command 264 may be generated by host 248 in response to a process initiated by user 46, wherein shred command 264 may be provided to (in this example) subsystem 200.

Figure 4:
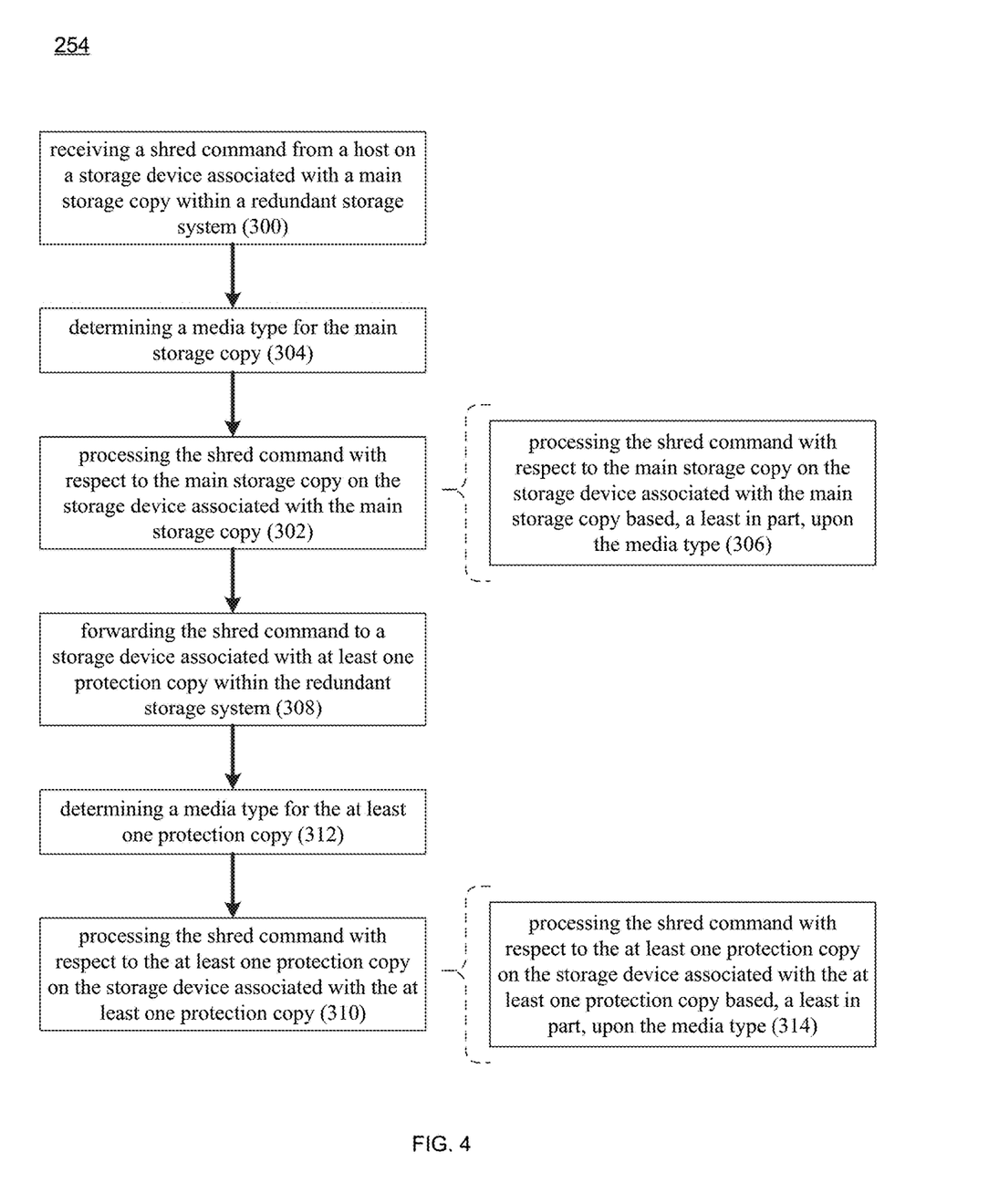
FIG. 4 is a flow chart of the shredding process of FIG. 3.

Security process 256 (alone or in combination with storage management process 10) may receive 300 shred command 264 from host 248 on a storage device (e.g., subsystem 200) associated with main storage copy 258 within a redundant storage system (e.g., storage system 12). For example, as subsystem 200 is the subsystem that contains/maintains main storage copy 258, subsystem 200 is the storage device that is associated with main storage copy 258.

Security process 256 (alone or in combination with storage management process 10) may process 302 shred command 264 with respect to main storage copy 258 on the storage device (e.g., subsystem 200) associated with main storage copy 258. For example, shred command 264 provided by host 248 may be a simple instructional command that instructs the recipient (e.g., subsystem 200) to shred main storage copy 258, wherein this shredding process (e.g., the execution of multiple processor-consuming redundant write operations) may be carried out by subsystem 200 (as opposed to host 248), thus freeing host 248 from the obligation and bandwidth consumption of doing the same.

Additionally, security process 256 (alone or in combination with storage management process 10) may determine 304 a media type for main storage copy 258. For example, security process 256 (alone or in combination with storage management process 10) may determine 304 if the main storage copy 258 is stored on e.g., rotating media (such as traditional hard drives) or solid-state storage devices (such as flash drives).

As is known in the art, solid-state storage devices are capable of being overwritten a limited amount of times. Accordingly, such solid-state storage devices often utilize wear-leveling algorithms to prevent wearing out a portion of the solid-state storage device prematurely. Therefore, such solid-state storage devices typically include an internal shredding algorithm that allows for the effectuation of a shredding procedure while reducing the impact of redundant write operations. Conversely, rotating media does not have such overwrite limitations and, therefore, may be shredded using a traditional redundant write procedure.

Accordingly and when processing 302 shred command 264 with respect to main storage copy 258, security process 256 (alone or in combination with storage management process 10) may process 306 shred command 264 with respect to main storage copy 258 on the storage device (e.g., subsystem 200) associated with main storage copy 258 based, a least in part, upon the media type. Accordingly, if main storage copy 258 is stored on rotating media, traditional redundant write procedures may be employed when shredding main storage copy 258. And if main storage copy 258 is stored on solid-state storage devices, shredding procedures tailored for solid-state storage devices may be employed when shredding main storage copy 258

Security process 256 (alone or in combination with storage management process 10) may forward 308 shred command 264 to a storage device associated with at least one protection copy within the redundant storage system (e.g., storage system 12). Continuing with the above-stated example, as there are two protection copies (namely first protection copy 260 and second protection copy 262), security process 256 (alone or in combination with storage management process 10) may forward 308 shred command 264 to subsystem 202 (i.e., the storage device associated with first protection copy 260) and to subsystem 204 (i.e., the storage device associated with second protection copy 262).

Security process 256 (alone or in combination with storage management process 10) may then process 310 shred command 264 with respect to the at least one protection copy on the storage device associated with the at least one protection copy. Accordingly, security process 256 (alone or in combination with storage management process 10) may process 310 shred command 264 with respect to first protection copy 260 on subsystem 202 (i.e., the storage device associated with the first protection copy 262). Further, security process 256 (alone or in combination with storage management process 10) may process 310 shred command 264 with respect to second protection copy 262 on subsystem 204 (i.e., the storage device associated with the second protection copy 262).

Again and for the reasons discussed above, security process 256 (alone or in combination with storage management process 10) may determine 312 a media type for the at least one protection copy (e.g., first protection copy 260 and second protection copy 262).

And when processing 310 shred command 264 with respect to the at least one protection copy (e.g., first protection copy 260 and second protection copy 262), security process 256 (alone or in combination with storage management process 10) may process 314 shred command 264 with respect to the at least one protection copy (e.g., first protection copy 260 and second protection copy 262) on the storage device (e.g., subsystem 202, 204) associated with the at least one protection copy (e.g., first protection copy 260 and second protection copy 262) based, a least in part, upon the media type.

Accordingly, if first protection copy 260 or second protection copy 262 is stored on rotating media, traditional redundant write procedures may be employed when shredding first protection copy 260 or second protection copy 262. And if first protection copy 260 or second protection copy 262 is stored on solid-state storage devices, shredding procedures tailored for solid-state storage devices may be employed when first protection copy 260 or and second protection copy 262.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing system, comprising:
   receiving a shred command from a host on a first storage subsystem associated with a main storage copy within a redundant storage system, wherein the first storage subsystem includes a first storage processor and a first set of storage targets, wherein the main storage copy is stored on at least one storage target of the first set of storage targets;
   determining a media type for the at least one storage target storing the main storage copy;
   processing, via the first storage processor of the first storage subsystem, the shred command with respect to the main storage copy on the at least one storage target storing the main storage copy based, at least in part, upon a shredding procedure specific to the media type for the at least one target storing the main storage copy;
   forwarding the shred command to at least a second storage subsystem associated with at least one protection copy within the redundant storage system, wherein each storage subsystem of the at least a second storage subsystem includes a storage processor and a set of storage targets; and
   processing, via the storage processor of the at least a second storage subsystem, the shred command with respect to the at least one protection copy on at least one storage target of the at least a second storage subsystem storing the at least one protection copy.

2. The computer-implemented method of claim 1 further comprising:
   determining a media type for the at least one storage target of the at least a second storage subsystem storing the at least one protection copy.

3. The computer-implemented method of claim 2 wherein processing the shred command with respect to the at least one protection copy includes:
   processing, via the storage processor of the at least a second storage subsystem, the shred command with respect to the at least one protection copy on at least one storage target of the at least a second storage subsystem storing the at least one protection copy based, at least in part, upon the media type for the at least one storage target of the at least a second storage subsystem storing the at least one protection copy.

4. A computer program product residing on a non-transitory computer readable medium having a plurality of instructions stored thereon which, when executed by a processor, cause the processor to perform operations comprising:
   receiving a shred command from a host on a first storage subsystem associated with a main storage copy within a redundant storage system, wherein the first storage subsystem includes a first storage processor and a first set of storage targets, wherein the main storage copy is stored on at least one storage target of the first set of storage targets;
   determining a media type for the at least one storage target storing the main storage copy;
   processing, via the first storage processor of the first storage subsystem, the shred command with respect to the main storage copy on the at least one storage target storing the main storage copy based, at least in part, upon a shredding procedure specific to the media type for the at least one target storing the main storage copy;
   forwarding the shred command to at least a second storage subsystem associated with at least one protection copy within the redundant storage system, wherein each storage subsystem of the at least a second storage subsystem includes a storage processor and a set of storage targets; and
   processing, via the storage processor of the at least a second storage subsystem, the shred command with respect to the at least one protection copy on at least one storage target of the at least a second storage subsystem storing the at least one protection copy.

5. The computer program product of claim 4 further comprising:
   determining a media type for the at least one storage target of the at least a second storage subsystem storing the at least one protection copy.

6. The computer program product of claim 5 wherein processing the shred command with respect to the at least one protection copy includes:

processing, via the storage processor of the at least a second storage subsystem, the shred command with respect to the at least one protection copy on at least one storage target of the at least a second storage subsystem storing the at least one protection copy based, at least in part, upon the media type for the at least one storage target of the at least a second storage subsystem storing the at least one protection copy.

7. A computing system including a processor and memory configured to perform operations comprising:

receiving a shred command from a host on a first storage subsystem associated with a main storage copy within a redundant storage system, wherein the first storage subsystem includes a first storage processor and a first set of storage targets, wherein the main storage copy is stored on at least one storage target of the first set of storage targets;

determining a media type for the at least one storage target storing the main storage copy;

processing, via the first storage processor of the first storage subsystem, the shred command with respect to the main storage copy on the at least one storage target storing the main storage copy based, at least in part, upon a shredding procedure specific to the media type for the at least one target storing the main storage copy;

forwarding the shred command to at least a second storage subsystem associated with at least one protection copy within the redundant storage system, wherein each storage subsystem of the at least a second storage subsystem includes a storage processor and a set of storage targets; and     processing, via the storage processor of the at least a second storage subsystem, the shred command with respect to the at least one protection copy on at least one storage target of the at least a second storage subsystem storing the at least one protection copy.

8. The computing system of claim 7 further configured to perform operations comprising:

determining a media type for the at least one storage target of the at least a second storage subsystem storing the at least one protection copy.

9. The computing system of claim 8 wherein processing the shred command with respect to the at least one protection copy includes:

processing, via the storage processor of the at least a second storage subsystem, the shred command with respect to the at least one protection copy on at least one storage target of the at least a second storage subsystem storing the at least one protection copy based, at least in part, upon the media type for the at least one storage target of the at least a second storage subsystem storing the at least one protection copy.

\* \* \* \* \*